(12) United States Patent
Kang

(10) Patent No.: US 12,321,086 B2
(45) Date of Patent: Jun. 3, 2025

(54) CAMERA MODULE

(71) Applicant: Samsung Electro-Mechanics Co., Ltd., Suwon-si (KR)

(72) Inventor: Sungho Kang, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 430 days.

(21) Appl. No.: 17/971,784

(22) Filed: Oct. 24, 2022

(65) Prior Publication Data

US 2023/0185168 A1 Jun. 15, 2023

(30) Foreign Application Priority Data

Dec. 14, 2021 (KR) .................. 10-2021-0178250

(51) Int. Cl.
*G03B 17/17* (2021.01)

(52) U.S. Cl.
CPC .................. *G03B 17/17* (2013.01)

(58) Field of Classification Search
CPC ..................................................... G03B 17/17
USPC ......................................................... 359/726
See application file for complete search history.

(56) References Cited

U.S. PATENT DOCUMENTS

| | | | |
|---|---|---|---|
| 2009/0002828 A1* | 1/2009 | Wilson | H01S 5/02255 |
| | | | 359/556 |
| 2015/0256727 A1 | 9/2015 | Kim et al. | |
| 2019/0004328 A1 | 1/2019 | Lee et al. | |
| 2019/0238728 A1 | 8/2019 | Hwang et al. | |

FOREIGN PATENT DOCUMENTS

| | | |
|---|---|---|
| KR | 10-1725442 B1 | 4/2017 |
| KR | 10-2019-0004121 A | 1/2019 |
| KR | 10-2019-0092803 A | 8/2019 |

* cited by examiner

*Primary Examiner* — William Choi
(74) *Attorney, Agent, or Firm* — NSIP Law

(57) ABSTRACT

A camera module is provided. The camera module includes a housing configured to have an inner space covered by a cover; a folded module which includes a reflective member configured to reflect light incident from the outside, and change a path of the light, and a moving holder on which the reflective member is mounted and configured to be movable in the inner space; a lens module positioned behind the folded module in the inner space and comprising a lens barrel including a plurality of lenses aligned in an optical axis direction and configured to allow light reflected from the reflective member to pass therethrough; and a damper positioned between the folded module and the lens module inside the housing, and comprising a first cushioning surface, a second cushioning surface, and a third cushioning surface which respectively face 3-axis directions orthogonal to each other.

20 Claims, 8 Drawing Sheets

CAMERA MODULE

CROSS-REFERENCE TO RELATED APPLICATIONS

This application claims the benefit under 35 USC § 119(a) of Korean Patent Application No. 10-2021-0178250, filed on Dec. 14, 2021, in the Korean Intellectual Property Office, the entire disclosure of which is incorporated herein by reference for all purposes.

BACKGROUND

1. Field

The following description relates to a camera module.

2. Description of Related Art

With the development of information communication technology and semiconductor technology, the distribution and implementation of electronic devices is rapidly increasing. These electronic devices may provide various operations by convergence rather than staying in their traditional unique domains.

Cameras may be implemented in portable electronic devices such as, but not limited to, smartphones, tablet personal computers (PC), and laptop computers, and an auto focus (AF) operation, an image stabilizer (IS) operation, and a zoom operation may be added to the camera of these portable electronic devices.

The image stabilizer (IS) operation may include camera shake compensation and/or hand shake compensation, and an image of a photographed subject may be prohibited from vibrating due to unintentional occurrence of hand shake or camera shake by a photographer when the camera is moving or stationary.

The auto focus (AF) operation is to obtain a clear image from an imaging plane of an image sensor by moving a lens positioned in front of the image sensor along an optical axis direction depending on a distance from the subject. This auto focus operation has been installed in expensive electronic devices, but has now become an essential feature installed in low-cost entry-level electronic devices.

Additionally, as the performance of the camera module has increased, it became necessary to secure reliability such as shock mitigation and noise prevention between internal components of the module for smooth implementation of the auto focus function, the image stabilization function, and the zoom function.

The above information disclosed in this Background section is only for enhancement of understanding of the background, and therefore, it may contain information that does not form the prior art that is already known in this country to a person of ordinary skill in the art.

SUMMARY

This Summary is provided to introduce a selection of concepts in a simplified form that is further described below in the Detailed Description. This Summary is not intended to identify key features or essential features of the claimed subject matter, nor is it intended to be used as an aid in determining the scope of the claimed subject matter.

In a general aspect, a camera module includes a housing configured to have an inner space covered by a cover; a folded module which comprises a reflective member configured to reflect light incident from the outside, and change a path of the light, and a moving holder on which the reflective member is mounted and configured to be movable in the inner space; a lens module positioned behind the folded module in the inner space, and comprising a lens barrel including a plurality of lenses aligned in an optical axis direction and configured to allow the light reflected from the reflective member to pass therethrough; and a damper positioned between the folded module and the lens module inside the housing, and comprising a first cushioning surface, a second cushioning surface, and a third cushioning surface which respectively face 3-axis directions orthogonal to each other.

The first cushioning surface may be positioned to face a first axis direction that is parallel to the optical axis direction, the second cushioning surface is positioned to face a second axis direction that intersects the first axis direction and is parallel to an incident direction of the light, and the third cushioning surface is positioned to face a third axis direction that is orthogonal to the first axis direction and the second axis direction.

The first cushioning surface may be positioned to face the lens module, the second cushioning surface is positioned to face the cover, and the third cushioning surface is positioned to face an inner wall of a pair of opposite inner walls of the housing that is farther away from the damper.

The camera module may further include a fourth cushioning surface positioned to face the second axis direction, and positioned to face an opposite direction to the second cushioning surface, and a fifth cushioning surface positioned to face the first axis direction and positioned to face an opposite direction to the first cushioning surface.

The fourth cushioning surface may be positioned to face a bottom of the housing, and the fifth cushioning surface may be positioned to face the folded module.

The moving holder may be provided to be rotatable with respect to the housing in the second axis direction or the third axis direction.

The lens barrel may be provided to be movable along the first axis direction with respect to the housing.

The damper may include a pair of dampers, and the pair of dampers may be formed to be symmetrical to each other with respect to a plane extending in an incident direction of the light while passing through the optical axis.

A pair of third cushioning surfaces may be positioned to face each other toward an inner wall of a pair of opposite inner walls of the housing that is farther away from the dampers in the pair of dampers.

In a general aspect, a camera module includes a housing configured to have an inner space covered by a cover; a folded module which includes a reflective member, and a moving holder on which the reflective member is mounted and configured to be movable in the inner space; a lens module positioned behind the folded module in the inner space, and including a lens barrel including a plurality of lenses aligned in an optical axis direction and configured to allow light reflected from the reflective member to be incident; and a damper fixedly provided between the folded module and the lens module inside the housing, and including a plurality of cushioning surfaces which face 3-axis directions orthogonal to each other.

The damper may include a support frame that has a first portion that extends in a second direction that intersects the optical axis direction and is parallel to an incident direction of the light and may b fixed to a bottom area of the housing; and a second portion that is bent from the first portion to extend in a first axis direction parallel to the optical axis direction, wherein a cushioning member may be positioned on the support frame.

The cushioning member may include a first cushioning member having a first cushioning surface and positioned on the first portion of the support frame; and a second cushioning member having a second cushioning surface and a third cushioning surface, and positioned on the second portion of the support frame.

The first cushioning surface may be positioned to face the lens module in an inside of the housing, the second cushioning surface may be positioned to face the cover in the inside of the housing, and the third cushioning surface may be positioned to face an inner wall of a pair of opposite inner walls of the housing that is farther away from the damper.

The second cushioning member may have a fourth cushioning surface positioned to face an opposite direction to the second cushioning surface.

The second cushioning member may be positioned to be biased toward an inside of the housing with respect to a center of the second portion of the support frame in a width direction.

The cushioning member may further include a third cushioning member positioned on the first portion of the support frame, the third cushioning member having a fifth cushioning surface positioned to face an opposite direction to the first cushioning surface.

A maximum thickness of the third cushioning member measured in the optical axis direction may be thinner than a maximum thickness of the first cushioning member measured in the optical axis direction.

The housing may include a protruding end having an insertion groove that protrudes from a bottom thereof and opening upward, and an end portion of the first portion of the support frame is inserted into the insertion groove and fixed thereto.

The first cushioning surface may have an outwardly convex embossing structure.

The damper may include a pair of dampers, and a pair of third cushioning surfaces of the pair of dampers are positioned to face each other toward an inner wall of a pair of opposite inner walls of the housing that is farther away from the dampers for the second cushioning members in the pair of dampers.

Other features and aspects will be apparent from the following detailed description, the drawings, and the claims.

BRIEF DESCRIPTION OF DRAWINGS

Throughout the drawings and the detailed description, the same reference numerals may refer to the same, or like, elements. The drawings may not be to scale, and the relative size, proportions, and depiction of elements in the drawings may be exaggerated for clarity, illustration, and convenience.

DETAILED DESCRIPTION

Figure 1:
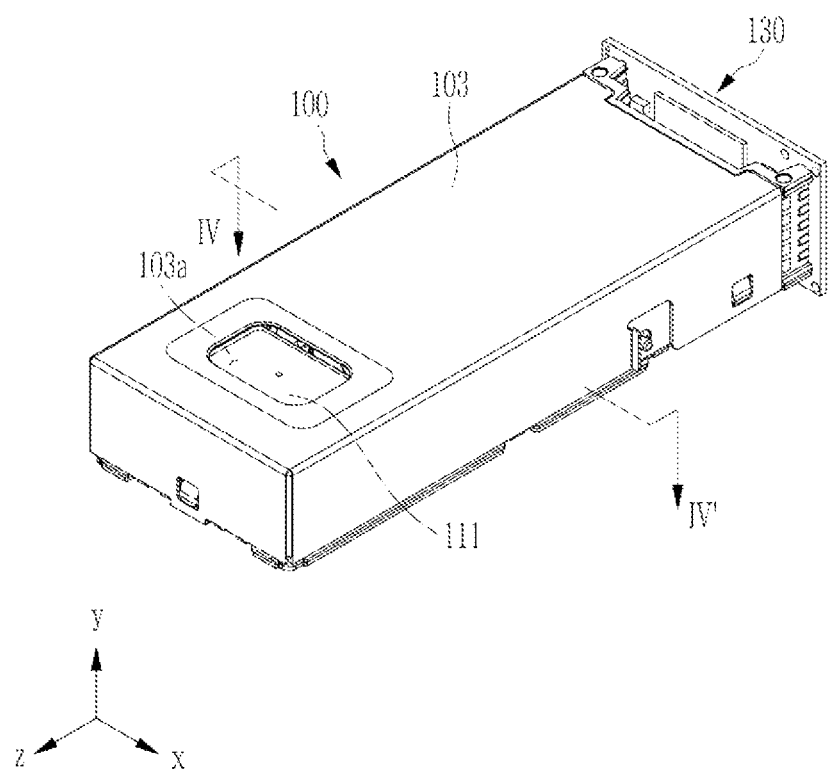
FIG. 1 illustrates a perspective view of an example camera module, in accordance with one or more embodiments.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known, after an understanding of the disclosure of this application, may be omitted for increased clarity and conciseness, noting that omissions of features and their descriptions are also not intended to be admissions of their general knowledge.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. Likewise, expressions, for example, "between" and "immediately between" and "adjacent to" and "immediately adjacent to" may also be construed as described in the foregoing.

The terminology used herein is for the purpose of describing particular examples only, and is not to be used to limit the disclosure. As used herein, the singular forms "a," "an," and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof. The use of the term "may" herein with respect to an example or embodiment (for example, as to what an example or embodiment may include or implement) means that at least one example or embodiment exists where such a feature is included or implemented, while all examples are not limited thereto.

Further, throughout the specification, the phrase "in a plan view" means when an object portion is viewed from above, and the phrase "in a cross-sectional view" means when a cross-section taken by vertically cutting an object portion is viewed from the side.

Unless otherwise defined, all terms, including technical and scientific terms, used herein have the same meaning as commonly understood by one of ordinary skill in the art to which this disclosure pertains consistent with and after an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

Throughout the specification, when referring to "vertical" or "orthogonal", it is not necessarily required to be formed at a strict right angle, and may be interpreted as including an acceptable level of error in the related art based on the right angle.

One or more examples may provide a camera module that is advantageous in mitigating an impact between mechanisms inside the module and preventing annoying noise.

One or more examples may alleviate an impact between devices driven inside a module and prevent occurrence of noise.

Figure 2:
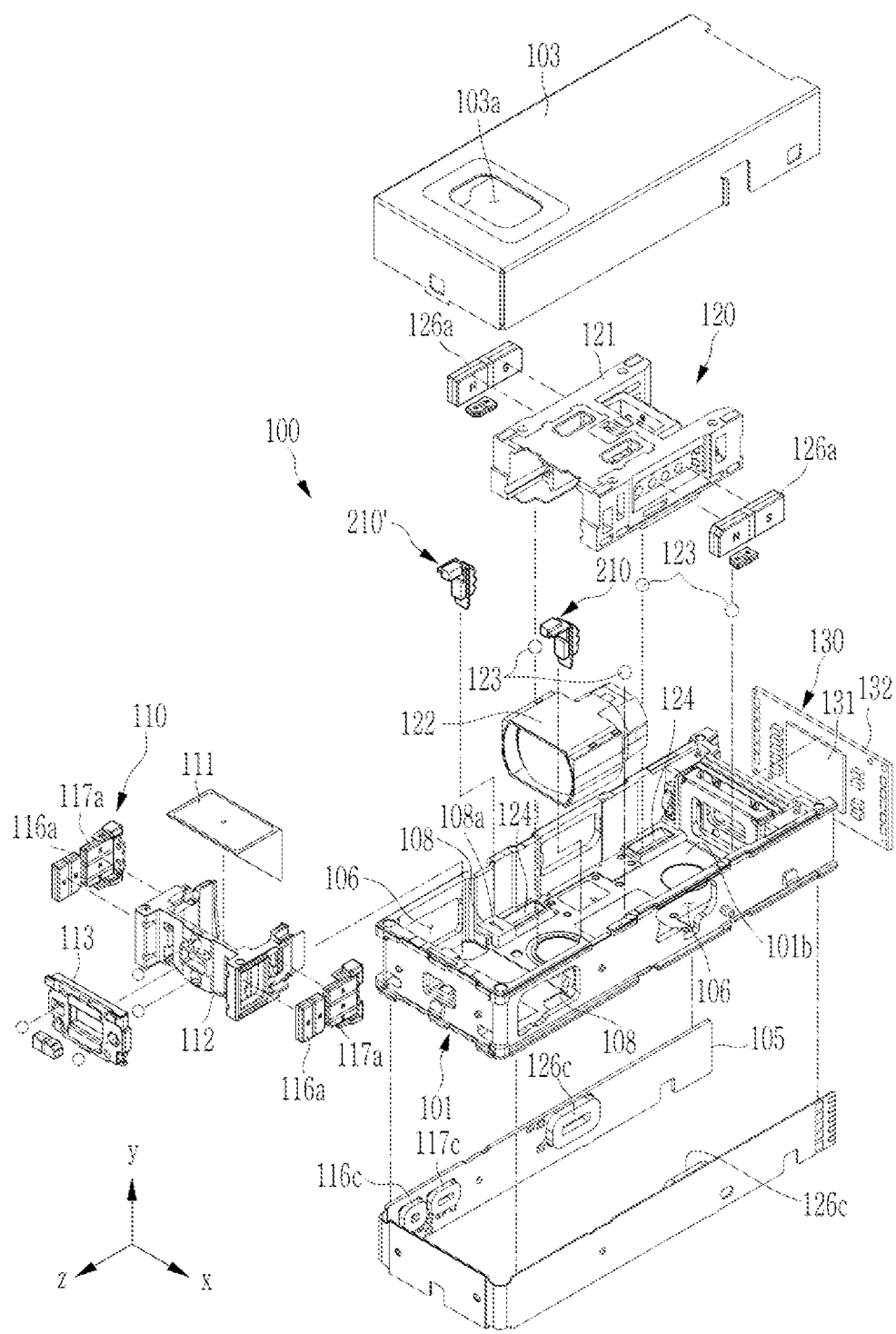
FIG. 2 illustrates an exploded perspective view schematically showing the example camera module shown in FIG. 1.

FIG. 1 illustrates a perspective view of an example camera module, in accordance with one or more embodiments, and FIG. 2 illustrates an exploded perspective view schematically showing the example camera module shown in FIG. 1.

Referring to FIG. 1 and FIG. 2, an example camera module 100, in accordance with one or more embodiments may include a prism or folded module 110, a lens module 120, and an image sensor module 130. The folded module 110 and the lens module 120 are accommodated in a housing 101. A cover 103 may partially surround an upper portion and a side surface of the housing 101, and may partially form an exterior of the camera module 100. Herein, in an unlimited example, the cover 103 may be a shield can.

The folded module 110 may be configured to change a direction of light incident from the outside. Light entering the camera through an opening 103a of the cover 103 may be reflected toward the lens module 120 by the folded module 110. In the one or more examples, the folded module 110 may include a reflective member 111, and the reflective member 111 may be provided in the form of a prism or a mirror, as only examples.

The lens module 120 includes a carrier 121 that is movably provided in an inner space of the housing 101 in the optical axis direction, and a lens barrel 122 that is fixed to the carrier 121 and has at least one lens therein. Light reflected from the folded module 110 is refracted while passing through the lens module 120. The light passing through the lens module 120 is incident on the image sensor 131. When the lens module includes a plurality of lenses, the lenses are arranged in the optical axis direction.

The image sensor module 130 may include an image sensor 131, and a substrate 132 on which the image sensor 131 is mounted. An image is formed on an image forming surface (or upper surface) of the image sensor 131, and in response, the image sensor 131 may generate an image signal for the formed image, and the image signal may be transferred to an external circuit through the substrate 132.

The camera module 100, in accordance with one or more embodiments, may provide an auto focus (AF) function or operation and an optical image stabilization (OIS) function or operation.

The lens module 120 may adjust a focal distance while reciprocating along an optical axis. An AF driver may be positioned at a side portion of the lens module 120. In the one or more examples, an AF magnet 126a is mounted on the lens module 120, and an AF coil 126c may be positioned at a position opposite to the AF magnet 126a. Electromagnetic interaction between the AF coil 126c and the AF magnet 126a causes the lens module 120 to move along the optical axis. The AF coil 126c is mounted on the substrate 105 attached to the housing 101, and the housing 101 may have an opening 106 such that the AF coil 126c and the AF magnet 126a face each other.

For smooth driving, ball members 123 may be positioned between the lens module 120 and a bottom surface 101b of the housing 101. The lens module 120 and the bottom surface 101b of the housing 101 may include guide grooves 124 that partially accommodate the ball members 123. The guide grooves 124 extend in a direction parallel to the optical axis, and a movement direction of the ball members 123 is limited to an extension direction of the guide groove 124 (i.e., optical axis direction).

A pulling device that pulls the lens module 120 to the bottom surface 101b of the housing 101 may be positioned between the lens module 120 and the housing 101. In the one or more examples, the pulling device may include an AF magnet 126a and a yoke positioned on the bottom surface 101b of the housing 101. In an example, a separate magnet distinguished from the AF magnet 126a may be mounted on a lower surface of the lens module 120, and a yoke may be positioned at a portion facing the separate magnet.

The lens module 120 is pulled toward the bottom surface 101b of the housing 101 by a magnetic attraction between the yoke and the AF magnet 126a (or a separate magnet). Accordingly, the ball members 123 may maintain a state of being in close contact with the guide groove 124 of the lens module 120 and the bottom surface 101b of the housing 101, which smooths the movement of the lens module 120 in the optical axis direction. That is, the pulling device may prevent the lens module 120 from moving in a direction other than the optical axis direction (e.g., y-axis direction or x-axis direction), and may contribute to improving AF performance.

A position sensor configured to measure a position of the lens module 120 in the optical axis direction may be positioned inside or outside the AF coil.

The OIS function may be implemented by rotating the folded module 110 based on an axis perpendicular to the optical axis.

For example, when the optical axis is referred to as a first axis, the first axis may be parallel to the z-axis of the drawing, a second axis that operates as an axis that is perpendicular to the optical axis and parallel to incident light may be parallel to the y-axis of the drawing, and a third axis serving as an axis that is perpendicular to the optical axis and the second axis may be parallel to the x-axis of the drawing.

The folded module 110 may include an OIS driver configured to rotate the reflective member 111 with respect to the housing 101 based on an axis perpendicular to the optical axis. The OIS driver may include a first OIS driver configured to rotate the reflective member 111 about the second axis perpendicular to the optical axis, and a second OIS driver configured to rotate it about the third axis perpendicular to the optical axis and orthogonal to the second axis.

As the OIS driver rotates the reflective member 111 about the second axis and/or the third axis, shaking of an image formed on the image sensor 131 due to shaking of the camera module 100 may be optically corrected.

The first OIS driver may be positioned at opposite sides of the moving holder 112. The first OIS driver may include first OIS magnets 116a respectively remounted on opposite sides of the moving holder 112 and first OIS coils 116c positioned at portions facing the respective first OIS magnets 116a. The first OIS coils 116c are fixedly coupled to the housing 101, and the floating holder 112 is rotatable relative to the housing 101 about the second axis that is perpendicular to the optical axis by electromagnetic interaction between the first OIS coils 116c and the first OIS magnets 116a.

In addition, a second OIS driver may be positioned adjacent to the first OIS driver at opposite sides of the moving holder 112. The second OIS driver may include second OIS magnets 117a respectively remounted on opposite sides of the moving holder 112 and second OIS coils 117c positioned at portions facing the respective second OIS magnets 117a. The second OIS coils 117c are fixedly coupled to the housing 101, and the floating holder 112 is rotatable relative to the housing 101 about the third axis that is perpendicular to the optical axis by electromagnetic interaction between the second OIS coils 117c and the second OIS magnets 117a.

The first OIS coil 116c and the second OIS coil 117c are attached to the substrate 105, and the substrate 105 is fixed to the housing 101. The housing 101 may include openings 106 configured to expose the first OIS coil 116c and the second OIS coil 117c into the housing 101.

A position sensor configured to measure a rotation angle of the floating holder 112 may be positioned inside or outside the coil. A position of the position sensor with respect to the OIS magnets 116a and 117a changes depending on rotation of a middle guide 113 (or the moving holder 112), and a rotational displacement of the middle guide 113 (or the moving holder 112) may be measured based on such a change in position. The position sensor may include, e.g., a magnetic sensor such as a hall sensor or a magnetoresistive sensor.

A space in which the folded module 110 is positioned and a space in which the lens module 120 is positioned may be separated from each other by a protruding end 108 in an inner space of the housing 101. That is, with reference to the protruding end 108, the folded module 110 may be provided at a front side of the housing 101 and the lens module 120 may be provided at a rear side of the housing 101. The protruding end 108 may be provided to have a shape that protrudes into an inner space of the housing from a bottom surface adjacent to opposite inner walls of the housing 101.

Figure 3A:
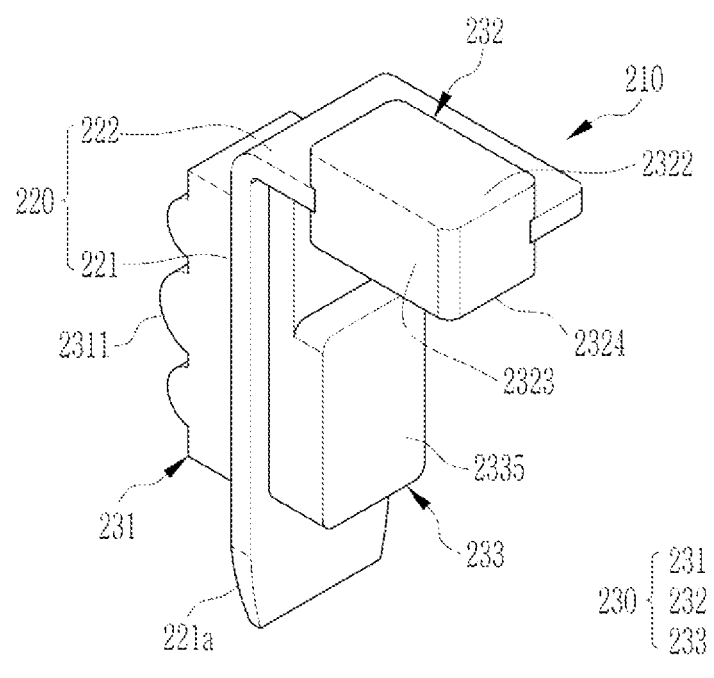
FIG. 3A and FIG. 3B each illustrate a perspective view showing a damper applied to the example camera module shown in FIG. 1.
Figure 3B:
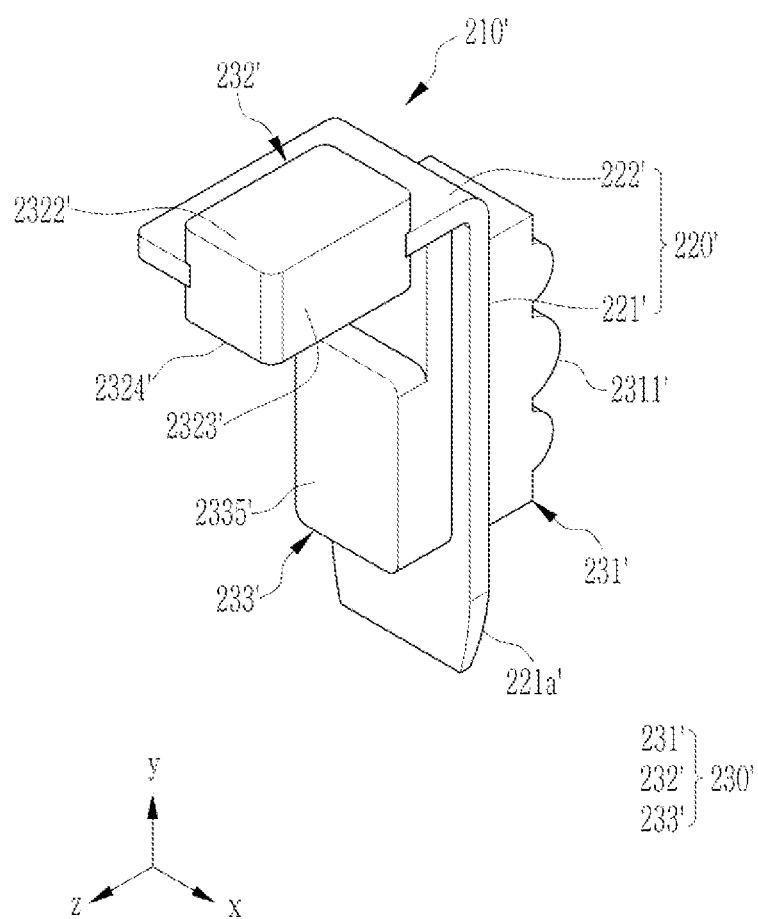

A pair of dampers 210 and 210' may be fixed or disposed between the folded module 110 and the lens module 120 inside the housing 101, and each of the dampers 210 and 210' includes support frames 220 and 220' and cushioning members 230 and 230' (see FIG. 3A and FIG. 3B). In a non-limiting example, the support frames 220 and 220' may be made of, as an example, a metallic material, e.g., SUS, and may be fixed inside the housing 101 as lower end portions thereof are fitted into insertion grooves 108a of the protruding end 108. The cushioning members 230 and 230' may be configured to reduce noise or reduce the effect of an impact force generated when the cushioning members 230 and 230' come into contact with the folded module 110 or the lens module 120. The dampers 210 and 210' may be positioned between the folded module 110 and the lens module 120 to limit the driving ranges of the folded module 110 and the lens module 120.

Hereinafter, the dampers 210 and 210', in accordance with one or more embodiments, and a configuration therearound will be described in more detail with reference to FIG. 3A to FIG. 7.

FIG. 3A and FIG. 3B each illustrate a perspective view of a damper applied to the example camera module shown in FIG. 1.

Referring to FIG. 3A, the damper 210, in accordance with one or more embodiments, includes a support frame 220 and a cushioning member 230. The support frame 220 includes a first portion 221 that extends in a second axis direction (y-axis direction) and a second portion 222 that is bent from the first portion 221 and extends in a first axis direction (z-axis direction). A first cushioning member 231 may be positioned on the first portion 221, and a second cushioning member 232 may be positioned on the second portion 222. A lower end 221a of the first portion 221 may be formed to have a wedge shape that becomes thinner toward the end, and thus may be fixed in the housing 101.

The first cushioning member 231 may have a first cushioning surface 2311, and the second cushioning member 232 may have a second cushioning surface 2322, a third cushioning surface 2323, and a fourth cushioning surface 2324. The first cushioning surface 2311, the second cushioning surface 2322, and the third cushioning surface 2323 may be formed to face 3-axis directions orthogonal to each other, respectively, and for example, the first cushioning surface 2311, the second cushioning surface 2322, and the third cushioning surface 2323 may face orthogonal directions to each other. The fourth cushioning surface 2324 may be positioned to face an opposite direction to the second cushioning surface 2322.

The damper 210, in accordance with one or more embodiments, may also include a third cushioning member 233 positioned on the first portion 221 of the support frame 220 to have a fifth cushioning surface 2335. The fifth cushioning surface 2335 may be positioned to face an opposite direction to the first cushioning surface 2311. In the one or more examples, the third cushioning member 233 may be integrally formed by extending from the second cushioning member 232.

The first cushioning surface 2311 may have an outwardly convex embossing structure. In the embossing structure, a plurality of rounded protrusions may be formed adjacent to each other in an extending direction of the first portion 221 of the support frame 220.

The first cushioning member 231 may be positioned to be biased to one side with respect to a center of the first portion 221 of the support frame 220 in a width direction, and the second cushioning member 232 may be positioned to be biased toward one side with respect to a center of the second portion 222 of the support frame 220 in the width direction. Herein, the width direction may be a direction that is perpendicular to a length direction in which the first portion 221 or the second portion 222 extends.

In the damper 210, in accordance with one or more embodiments, the support frame 220 may be made of a metallic material, and the cushioning member 230 may be made of, as only examples, urethane, rubber, or silicon. Additionally, the support frame 220 and the cushioning member 230 may be manufactured to be integrally configured through an insert molding method.

In one or more examples, the second cushioning member 232 may be formed as a single member having a second cushioning surface 2322, a third cushioning surface 2323, and a fourth cushioning surface 2324. However, the second cushioning surface 2322, the third cushioning surface 2323, and the fourth cushioning surface 2324 may each be formed as a separate member, or may be divided into a member having two selected surfaces and a member having one surface. For example, the second cushioning surface and the third cushioning surface may be implemented as a same member and the fourth cushioning surface may be implemented as a separate member, or the second cushioning surface may be formed as a separate member and the third cushioning surface and the fourth cushioning surface may be formed as a same member.

Referring to FIG. 3B, a damper 210' may have a mirror-symmetric relationship with the damper 210 described with reference to FIG. 3A, and includes a support frame 220' and a cushioning member 230'. The support frame 220 includes a first portion 221' extending in a second axis direction (y-axis direction) and a second portion 222' bent from the first portion 221' and extending in a first axis direction (z-axis direction). A first cushioning member 231' having a first cushioning surface 2311' may be positioned on the first portion 221', and a second cushioning member 232' having second, third, and fourth cushioning surfaces 2322', 2323', and 2324' may be positioned on the second portion 222'. It may also include a third cushioning member 233 positioned on the first portion 221' of the support frame 220' to have a fifth cushioning surface 2335'.

Figure 4:
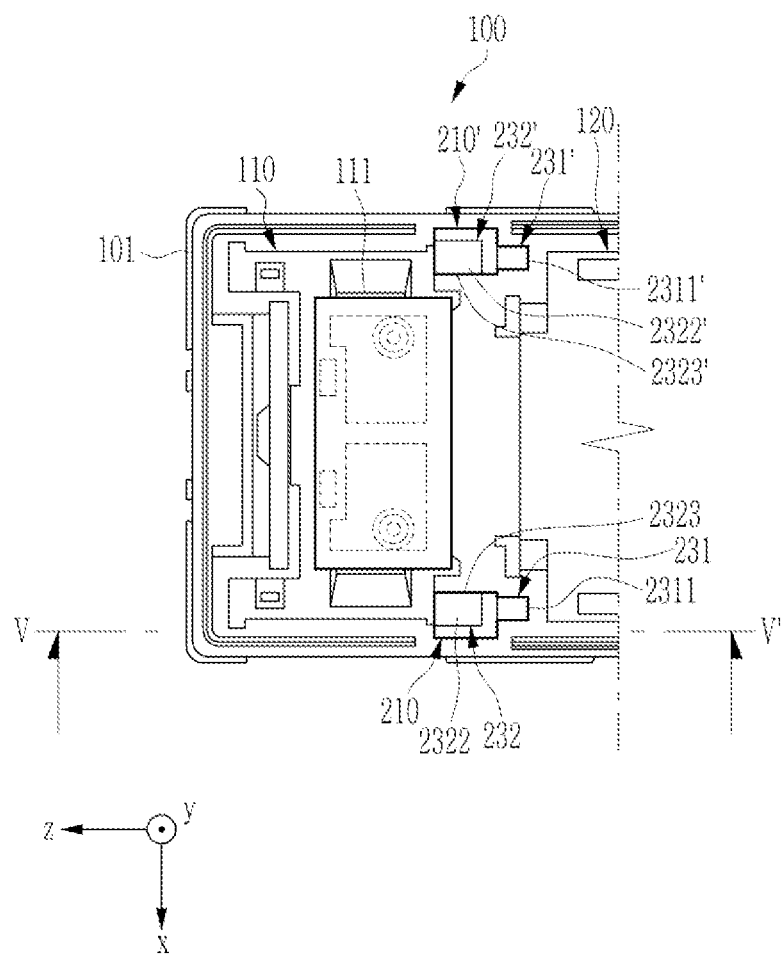
FIG. 4 illustrates a partial cross-sectional view taken along a line IV-IV' of FIG. 1.
Figure 5:
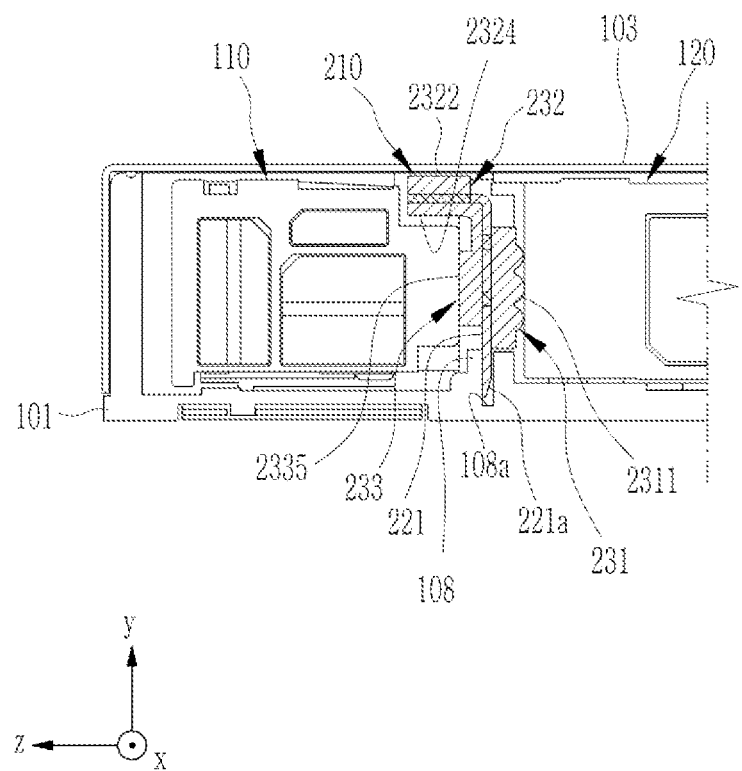
FIG. 5 illustrates a cross-sectional view taken along a line V-V' of FIG. 4.

FIG. 4 illustrates a partial cross-sectional view taken along a line IV-IV' of FIG. 1, and FIG. 5 illustrates a cross-sectional view taken along a line V-V' of FIG. 4.

Referring to FIG. 4 and FIG. 5, the dampers 210 and 210' of the camera module 100, in accordance with one or more embodiments, may be positioned between the folded module 110 and the lens module 120 inside the housing 101. The dampers 210 and 210' respectively include first cushioning surfaces 2311 and 2311', second cushioning surfaces 2322 and 2322', and third cushioning surfaces 2323 and 2323' which face 3-axis directions orthogonal to each other. The first cushioning surfaces 2311 and 2311' may be respectively constituted by the first cushioning members 231 and 231', and the second cushioning surfaces 2322 and 2322' and the third cushioning surfaces 2323 and 2323' may be respectively configured by the second cushioning members 232 and 232'.

The dampers 210 and 210' may include fourth cushioning surfaces 2324 and 2324' positioned toward a bottom of the housing 101 while being positioned at the second portions 222 and 222' of the support frames 220 and 220', and fifth cushioning surfaces 2335 and 2335' positioned toward the folded module 110 while being positioned at the first portions 221 and 221' of the support frames 220 and 220'. The fourth cushioning surfaces 2324 and 2324' may be respectively constituted by the second cushioning members 232 and 232', and may be respectively positioned to face opposite directions to the second cushioning surfaces 2322 and 2322'. The fifth cushioning surfaces 2335 and 2335' may be respectively constituted by the third cushioning members 233 and 233', and may be respectively positioned to face opposite directions to the first cushioning surfaces 2311 and 2311'.

The dampers 210 and 210' may be respectively fixed to the bottom of the housing 101 through the first portions 221 and 221' of the support frames 220 and 220'. The lower end 221a may be inserted into the insertion groove 108a of the protruding end 108 formed on the bottom of the housing 101 in the first portions 221 and 221'. The protruding end 108 may protrude from the bottom of the housing 101 such that a space in which the folded module 110 is positioned and a space in which the lens module 120 is positioned are separated.

In the camera module 100, the first cushioning surfaces 2311 and 2311' and the fifth cushioning surfaces 2335 and 2335' may be respectively positioned to face the first axis direction parallel to the optical axis direction (z-axis direction in the drawing). The second cushioning surfaces 2322 and 2322' and the fourth cushioning surfaces 2324 and 2324' may be respectively positioned so as to face the second axis direction (y-axis direction in the drawing) that intersects the first axis direction and is parallel to a light incident direction, and the third cushioning surfaces 2323 and 2323' may be respectively positioned to face the third axis direction (x-axis direction of the drawing) orthogonal to the first axis direction and the second axis direction.

Accordingly, the first cushioning surfaces 2311 and 2311' may be respectively positioned toward the lens module 120 in the first portions 221 and 221' of the support frames 220 and 220', and the second cushioning surfaces 2322 and 2322' may be respectively positioned toward the cover 103 in the second portions 222 and 222' of the support frames 220 and 220'. The third cushioning surfaces 2323 and 2323' may be positioned to face an inner wall having a greater distance from the damper among a pair of facing inner walls of the housing 101. That is, in the pair of mirror-symmetrical dampers 210 and 210', the third cushioning surfaces 2323 and 2323' may be positioned to face each other toward the inner wall opposite to the housing 101 with the reflective member 111 provided therebetween. Additionally, the fourth cushioning surfaces 2324 and 2324' may be respectively positioned toward the bottom of the housing 101 in the second portions 222 and 222', and the fifth cushioning surfaces 2335 and 2335' may be respectively positioned toward the folded module 110 from the first portions 221 and 221'.

In this example, the first cushioning surfaces 2311 and 2311' may have an embossing structure that is convex toward the lens module 120. The second cushioning surfaces 2322 and 2322' may be respectively positioned to be biased toward an inside of the housing 101 with respect to a center of the second portions 222 and 222' in the width direction. Additionally, when the pair of dampers 210 and 210' are spaced apart from each other so as to be adjacent to the pair of inner walls of the housing 101 facing each other, the third cushioning surfaces 2323 and 2323' may be positioned to face each other, and a first edge of the reflective member 111 may be positioned therebetween (see FIG. 4). A maximum thickness of the third cushioning members 233 and 233' in the optical axis direction may be thinner than a maximum thickness of the first cushioning members 231 and 231' in the optical axis direction.

When the pair of dampers 210 and 210' are included in the camera module 100, the pair of dampers 210 and 210' may be symmetrically formed with respect to the center of the housing 101 in the width direction. Specifically, the pair of dampers 210 and 210' may respectively have shapes that are symmetrical to each other based on a plane extending in an incident direction of light while passing through the optical axis.

Referring to FIG. 5, the folded module 110 and the lens module 120 are positioned at opposite sides in the optical axis direction with respect to the dampers 210 and 210'. Accordingly, the first cushioning members 231 and 231' of the dampers 210 and 210' may respectively be positioned at the lens module 120 in the first portions 221 and 221' of the support frames 220 and 220', and the first cushioning surfaces 2311 and 2311' may be positioned to face the lens module 120. When the lens module 120 moves in the optical axis direction during a driving process, one surface of the lens module 120 thereof collides with the first cushioning surfaces 2311 and 2311' of the dampers 210 and 210', thereby alleviating the effect of impact forces, and preventing noise from occurring. Additionally, when the folded module 110 moves in the optical axis direction during a driving process, one surface of the folded module 110 thereof collides with the fifth cushioning surfaces 2335 and 2335' of the dampers 210 and 210', thereby alleviating the effect of impact forces, and preventing noise from occurring.

Accordingly, the first cushioning surfaces 2311 and 2311' of the dampers 210 and 210' may function as an AF stopper, and the fifth cushioning surfaces 2335 and 2335' may function as a stopper for the folded module 110.

Figure 6:
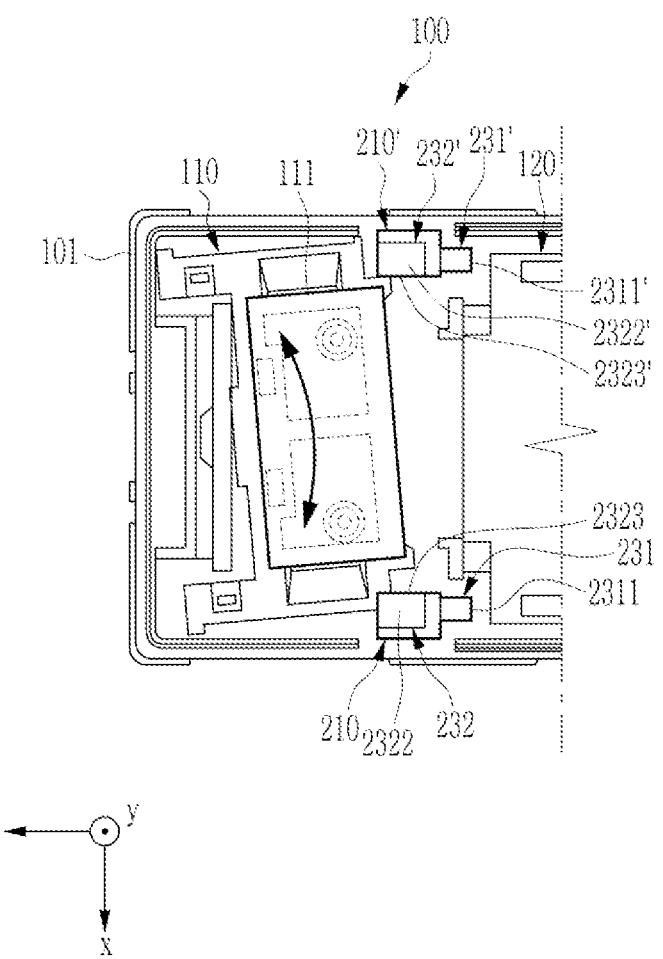
FIG. 6 illustrates an example of an action of a damper in the partial cross-sectional view of the example camera module illustrated in FIG. 4.
Figure 7:
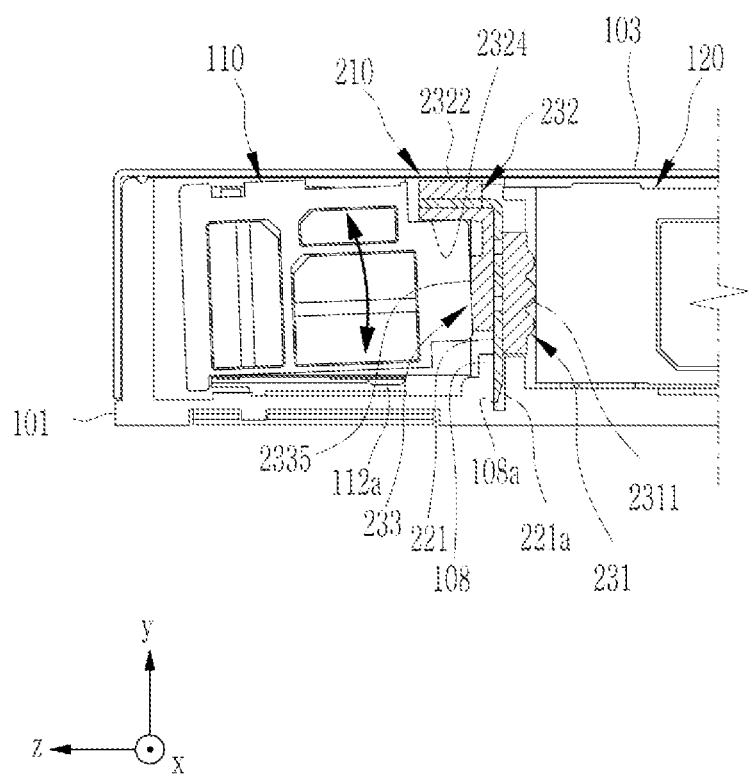
FIG. 7 illustrates an example of an action of damper in the cross-sectional view of the example camera module illustrated in FIG. 5.

FIG. 6 illustrates an example of an action of a damper in the partial cross-sectional view of the example camera module illustrated in FIG. 4, and FIG. 7 illustrates an example of an action of a damper in the cross-sectional view of the example camera module illustrated in FIG. 5.

Referring to FIG. 6, inside the example camera module 100, in accordance with one or more embodiments, the folded module 110 may rotate left and right about the second axis (y-axis in the drawing) by the action of the OIS driver. In this example, opposite corners of the folded module 110 on which the reflective member 111 is mounted may respectively collide with the third cushioning surfaces 2323 and 2323' of the dampers 210 and 210', thus alleviating the effect of impact forces, and preventing the occurrence of noise. Accordingly, the third cushioning surfaces 2323 and 2323' of the dampers 210 and 210' may function as an OIS X stopper.

Referring to FIG. 7, inside the camera module 100, in accordance with one or more embodiments, the folded module 110 may rotate up and down about the third axis (x-axis in the drawing) based on an operation of the OIS driver. In this example, opposite upper corners of the folded module 110 on which the reflective member 111 is mounted may collide with the fourth cushioning surfaces 2324 of the damper 210, alleviating the impact and preventing occurrence of noise. Accordingly, the fourth cushioning surface 2324 of the damper 210 may function as an upper OIS Y stopper.

Furthermore, since the second cushioning surface 2322 of the damper 210 faces an inner surface of the cover 103, the second cushioning surface 2322 of the damper 210 may collide with the inner surface of the cover 103 when the folded module 110 is rotated up and down, thus alleviating the effect of impact forces and preventing occurrence of noise.

A damping protrusion 112*a* protruding downward from a bottom surface of the moving holder 112 accommodating the reflective member 111 may be formed on a lower surface of the folded module 110. Accordingly, when the folded module 110 collides with the bottom surface of the housing 101, the damping protrusion 112*a* may alleviate an impact force between the folded module 110 and the housing 101 and may prevent the occurrence of noise.

While this disclosure includes specific examples, it will be apparent to one of ordinary skill in the art, after an understanding of the disclosure of this application, that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera module, comprising:
   a housing configured to have an inner space covered by a cover;
   a folded module which comprises a reflective member configured to reflect light incident from the outside, and change a path of the light, and a moving holder on which the reflective member is mounted and configured to be movable in the inner space;
   a lens module positioned behind the folded module in the inner space, and comprising a lens barrel including a plurality of lenses aligned in an optical axis direction and configured to allow the light reflected from the reflective member to pass therethrough; and
   a damper positioned between the folded module and the lens module inside the housing, and comprising a first cushioning surface, a second cushioning surface, and a third cushioning surface which respectively face 3-axis directions orthogonal to each other.

2. The camera module of claim 1, wherein:
   the first cushioning surface is positioned to face a first axis direction that is parallel to the optical axis direction, the second cushioning surface is positioned to face a second axis direction that intersects the first axis direction and is parallel to an incident direction of the light, and the third cushioning surface is positioned to face a third axis direction that is orthogonal to the first axis direction and the second axis direction.

3. The camera module of claim 2, wherein:
   the first cushioning surface is positioned to face the lens module,
   the second cushioning surface is positioned to face the cover, and
   the third cushioning surface is positioned to face an inner wall of a pair of opposite inner walls of the housing that is farther away from the damper.

4. The camera module of claim 2, further comprising:
   a fourth cushioning surface positioned to face the second axis direction, and positioned to face an opposite direction to the second cushioning surface, and
   a fifth cushioning surface positioned to face the first axis direction and positioned to face an opposite direction to the first cushioning surface.

5. The camera module of claim 4, wherein:
   the fourth cushioning surface is positioned to face a bottom of the housing, and
   the fifth cushioning surface is positioned to face the folded module.

6. The camera module of claim 2, wherein the moving holder is provided to be rotatable with respect to the housing in the second axis direction or the third axis direction.

7. The camera module of claim 2, wherein the lens barrel is provided to be movable along the first axis direction with respect to the housing.

8. The camera module of claim 2, wherein:
the damper comprises a pair of dampers, and
the pair of dampers are formed to be symmetrical to each other with respect to a plane extending in an incident direction of the light while passing through the optical axis.

9. The camera module of claim 8, wherein a pair of third cushioning surfaces are positioned to face each other toward an inner wall of a pair of opposite inner walls of the housing that is farther away from the dampers in the pair of dampers.

10. A camera module, comprising:
a housing configured to have an inner space covered by a cover;
a folded module which comprises a reflective member, and a moving holder on which the reflective member is mounted and configured to be movable in the inner space;
a lens module positioned behind the folded module in the inner space, and comprising a lens barrel including a plurality of lenses aligned in an optical axis direction and configured to allow light reflected from the reflective member to be incident; and
a damper fixedly provided between the folded module and the lens module inside the housing, and comprising a plurality of cushioning surfaces which face 3-axis directions orthogonal to each other.

11. The camera module of claim 10, wherein the damper comprises:
a support frame that has a first portion that extends in a second direction that intersects the optical axis direction and is parallel to an incident direction of the light and is fixed to a bottom area of the housing; and
a second portion that is bent from the first portion to extend in a first axis direction parallel to the optical axis direction,
wherein a cushioning member is positioned on the support frame.

12. The camera module of claim 11, wherein the cushioning member comprises:
a first cushioning member having a first cushioning surface and positioned on the first portion of the support frame; and
a second cushioning member having a second cushioning surface and a third cushioning surface, and positioned on the second portion of the support frame.

13. The camera module of claim 12, wherein:
the first cushioning surface is positioned to face the lens module in an inside of the housing,
the second cushioning surface is positioned to face the cover in the inside of the housing, and
the third cushioning surface is positioned to face an inner wall of a pair of opposite inner walls of the housing that is farther away from the damper.

14. The camera module of claim 12, wherein the second cushioning member has a fourth cushioning surface positioned to face an opposite direction to the second cushioning surface.

15. The camera module of claim 12, wherein the second cushioning member is positioned to be biased toward an inside of the housing with respect to a center of the second portion of the support frame in a width direction.

16. The camera module of claim 12, wherein:
the cushioning member further comprises a third cushioning member positioned on the first portion of the support frame, the third cushioning member having a fifth cushioning surface positioned to face an opposite direction to the first cushioning surface.

17. The camera module of claim 16, wherein a maximum thickness of the third cushioning member measured in the optical axis direction is thinner than a maximum thickness of the first cushioning member measured in the optical axis direction.

18. The camera module of claim 12, wherein the first cushioning surface has an outwardly convex embossing structure.

19. The camera module of claim 12, wherein:
the damper comprises a pair of dampers, and
a pair of third cushioning surfaces of the pair of dampers are positioned to face each other toward an inner wall of a pair of opposite inner walls of the housing that is farther away from the dampers for the second cushioning members in the pair of dampers.

20. The camera module of claim 11, wherein:
the housing comprises a protruding end having an insertion groove that protrudes from a bottom thereof and opening upward, and
an end portion of the first portion of the support frame is inserted into the insertion groove and fixed thereto.

* * * * *